United States Patent [19]

Akiyama et al.

[11] Patent Number: 5,388,497
[45] Date of Patent: Feb. 14, 1995

[54] BRAIDED STRUCTURE FORMING APPARATUS

[75] Inventors: Yasuo Akiyama, Kyoto; Zenichiro Maekawa, Amagasaki; Hiroyuki Hamada, Shiga; Atsushi Yokoyama, Tsu, all of Japan

[73] Assignee: Murata Kikai Kabushiki Kaisha, Kyoto, Japan

[21] Appl. No.: 29,248

[22] Filed: Mar. 10, 1993

Related U.S. Application Data

[60] Continuation-in-part of Ser. No. 865,938, Apr. 9, 1992, abandoned, which is a division of Ser. No. 742,617, Aug. 8, 1991, abandoned.

[30] Foreign Application Priority Data

Aug. 25, 1990 [JP] Japan ................................. 2-223854

[51] Int. Cl.$^6$ ................................................ D04C 3/06
[52] U.S. Cl. ........................................... 87/34; 87/41
[58] Field of Search ............................... 87/1, 6–9, 87/11, 13, 23, 33, 34, 41, 44, 48, 62

[56] References Cited

U.S. PATENT DOCUMENTS

| | | | |
|---|---|---|---|
| 2,079,369 | 5/1937 | Bradley | 87/6 X |
| 2,079,836 | 5/1937 | Brown et al. | 87/41 X |
| 3,586,058 | 6/1971 | Ahrens | 138/109 X |
| 4,519,290 | 5/1985 | Inman et al. | 87/7 |
| 4,992,313 | 2/1991 | Shobert et al. | 87/1 X |

FOREIGN PATENT DOCUMENTS 53387 12/1984 Japan ................................. 87/62

*Primary Examiner*—Joseph J. Hail, III
*Attorney, Agent, or Firm*—Spensley Horn Jubas & Lubitz

[57] ABSTRACT

A braided structure forming device suitable for forming a braided structure of a complicated structure capable of serving as the core of FRP and FRTP, in which a speed of pulling up or down a braided structure is varied in process with time to vary the structural density thereof.

12 Claims, 14 Drawing Sheets

FIG. 5(1)
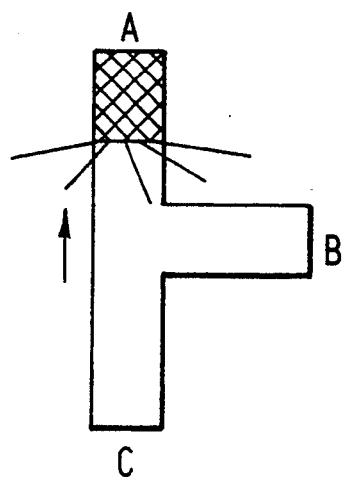
FIG. 5(2)
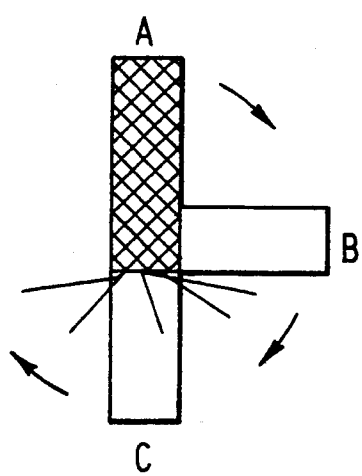
FIG. 5(3)
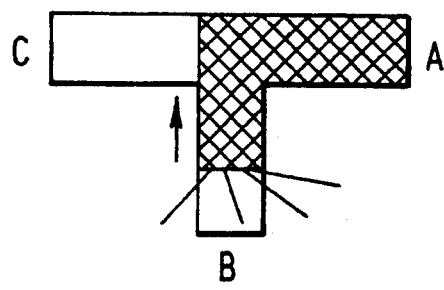
FIG. 5(4)
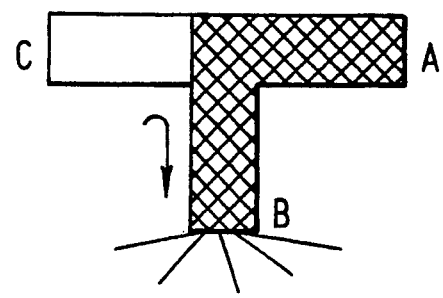
FIG. 5..(5)
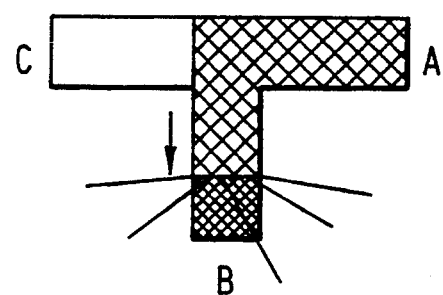
FIG. 5(6)
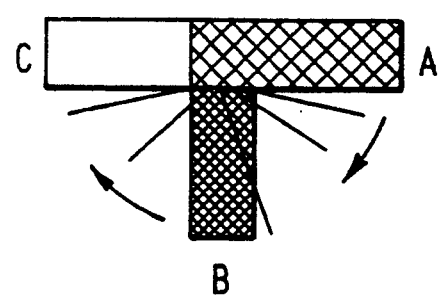

BRAIDED STRUCTURE FORMING APPARATUS

The present application is a continuation-in-part of U.S. application Ser. No. 07/865,938, filed Apr. 9, 1992, which is a divisional of U.S. application Ser. No. 07/742,617, filed Aug. 8, 1991, both of which are now abandoned.

BACKGROUND OF THE INVENTION

1. Field of the Invention

The present invention relates to a braided structure forming method, and in particular to the formation of a braided structure capable of serving as the core of a fiber reinforced plastic using a thermosetting resin or a fiber reinforced plastic using a thermoplastic resin.

2. Related Art Statement

There have been fiber reinforced plastics using thermosetting resin (hereinafter abbreviated as "FRP") and fiber reinforced plastics using thermoplastic resin (hereinafter abbreviated as "FRTP") that employ, as cores, glass fiber braids or carbon fiber braids having simple shapes. Conventional braided structures having complicated shapes for use as the core of an FRP or an FRTP have been formed by combining a plurality of braids of different shapes.

FRP's and FRTP's provided with such conventional braided structures that have a complicated shape have a problem in that the strength of portions thereof corresponding to the junctions of the component braids of the braided structure is not sufficiently high. Some of the FRP's and FRTP's are therefore not capable of practical application.

OBJECT AND SUMMARY OF THE INVENTION

Accordingly, it is an object of the present invention to provide a braided structure forming method suitable for forming a braided structure having a complicated structure capable of serving as the core of an FRP or an FRTP.

To achieve this and other objectives, the present invention provides a braided structure forming method comprising varying the speed at which the braided structure is pulled up or pulled down in process with time.

In one aspect, a braided structure forming method in accordance with the present invention varies the speed of pulling up or down a braided structure in process with time to vary the structural density, and in some cases the thickness, of the braided structure.

DETAILED DESCRIPTION OF THE PREFERRED EMBODIMENTS

A braided structure forming method in accordance with a preferred embodiment of the present invention will be described as applied to the formation of a T-shaped tubular braided structure.

The illustrated braided structure forming method may employ a conventional cord braiding machine, a special mandrel, and a special cylindrical guide to braid a T-shaped, tubular, braided structure.

Figure 1:
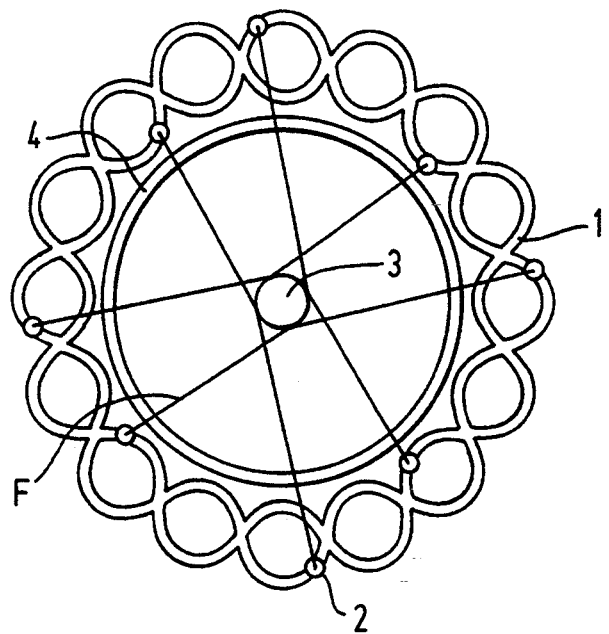
FIG. 1 shows a schematic plan view of an example of a braiding machine for use in forming one type of braided structure in accordance with the present invention.

As shown in FIG. 1, the cord braiding machine in the illustrated embodiment has a disk provided with a substantially circular track 1. A plurality of bobbin carriers 2 are capable of moving clockwise or counterclockwise along the circular track 1 for braiding. The strands F drawn out from bobbins mounted respectively on the bobbin carriers 2 are intertwined with each other on a mandrel 3. The mandrel 3 is disposed above the center of the circular track 1 and is capable of being raised for braid formation. The bobbin carriers 2 are rotated by driving gears disposed under the disk while the bobbin carriers move along the circular track 1. The ratio between the moving speed of the bobbin carriers 2 and the rising speed of the mandrel 3 may be changed by changing the gear ratio, so that the cord braiding machine is able to form braids that differ from each other in the angle of arrangement of the strands.

Figure 2:
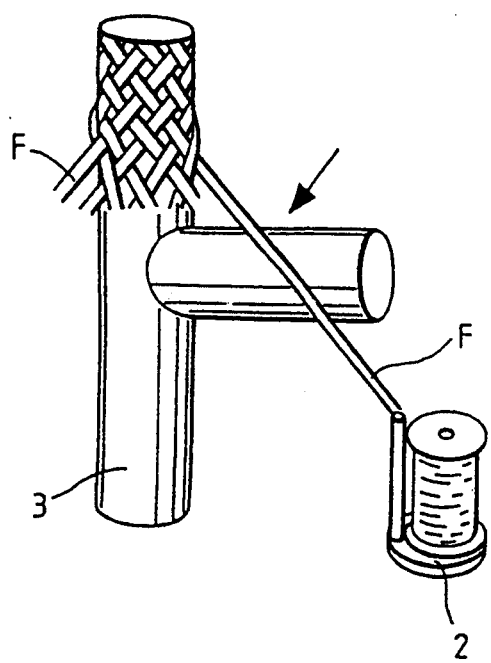
FIG. 2 shows a pictorial view that is of assistance in explaining a problem that may occur in forming a T-shaped, tubular, braided structure without using a cylindrical guide.
Figure 3:
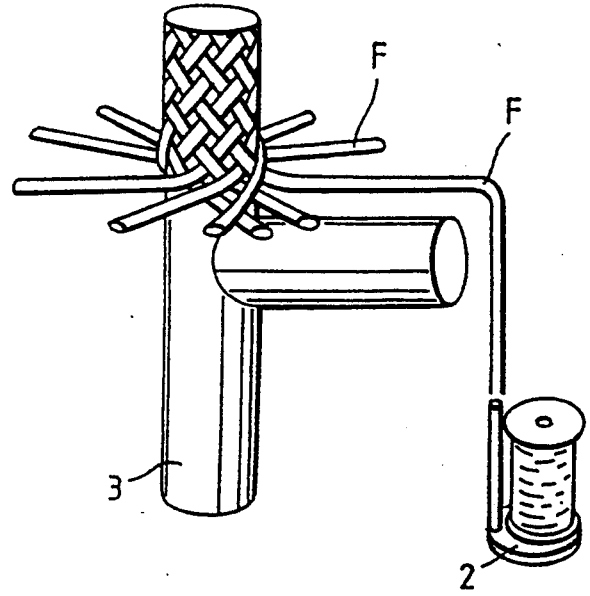
FIG. 3 shows a pictorial view of a braiding condition in which a strand is raised to avoid the problem.
Figure 6:
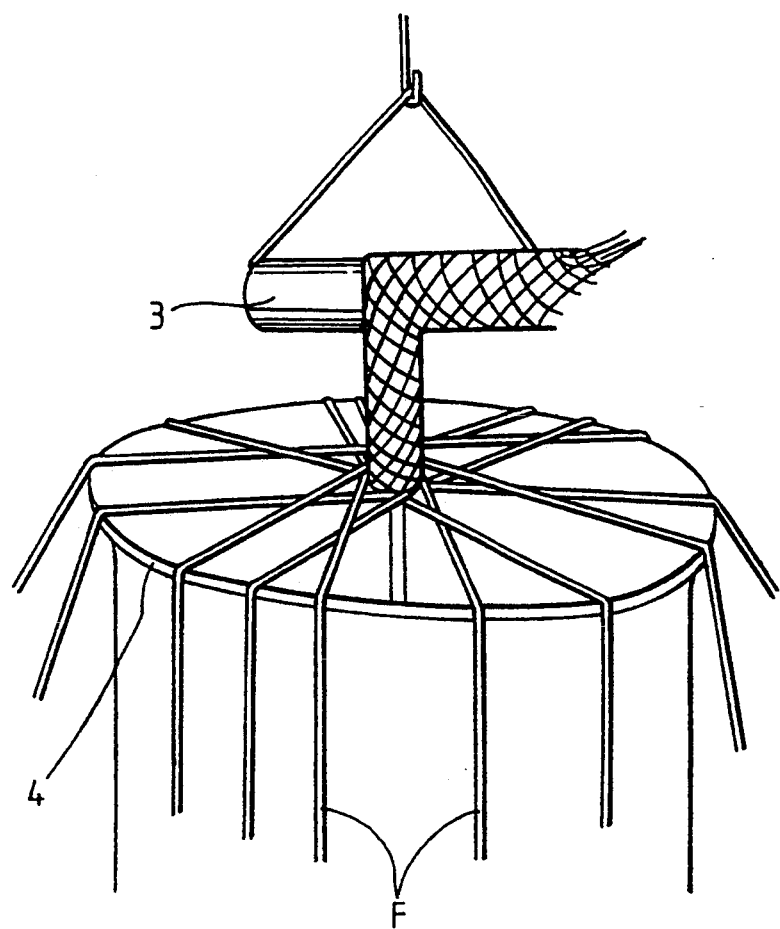
FIG. 6 shows a perspective view showing a positional relationship between a mandrel and a cylindrical guide in the formation of an exemplary braided structure.

As shown in FIGS. 2 and 3, the mandrel 3 employed in the illustrated embodiment is formed by joining round tubes in a shape resembling the letter "T". The mandrel 3 thus constructed by joining the round tubes can easily be suspended with its leg portion or branched portion in a vertical orientation by a string passed through its arm portion, as shown in FIG. 6. Formed of a light material, such as a plastic, the mandrel 3 is liable to be moved laterally by the tension of the strands. Therefore, it may be desirable to load the T-shaped mandrel 3 to prevent such lateral movement.

Figure 4:
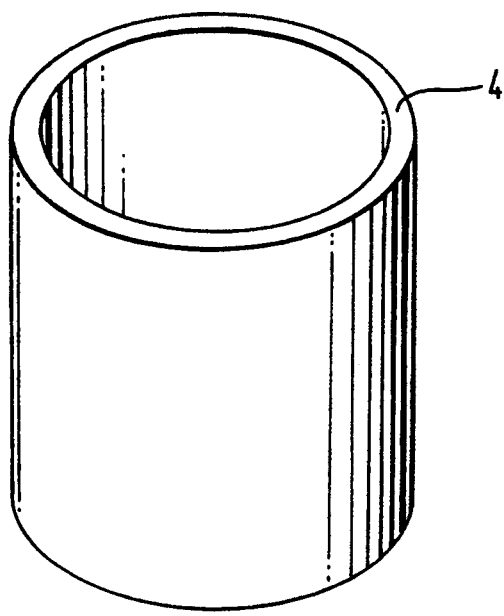
FIG. 4 shows a perspective view of a cylindrical guide.

A cylindrical guide 4 may be needed when the T-shaped mandrel 3 is employed. If the strands F are braided in a conventional manner without using the cylindrical guide 4, then the movement of the strands F may be obstructed by the leg portion of the mandrel 3, as indicated by the arrow in FIG. 2. Accordingly, the strands F must be guided as shown in FIG. 3 by the cylindrical guide 4 disposed inside the circular track 1, as shown in FIG. 1. Alternatively, a circular guide supported by a plurality of legs may be substituted for the cylindrical guide 4 shown in FIG. 4. In the illustrated embodiment, the height of the upper end of the cylindrical guide 4 from the surface of the disk provided with the circular track 1 is about 2.5 times the height of the bobbins mounted on the bobbin carriers 2. Another guide may be disposed above the cylindrical guide 4.

The steps of a braided structure forming method in forming a T-shaped, tubular, braided structure will be described with reference to FIG. 5.

Figure 5:
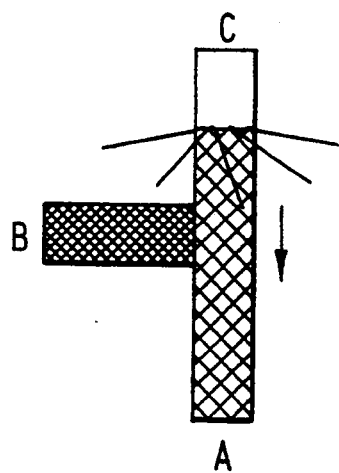
FIGS. 5(1) to 5(10) show views that are of assistance in explaining several steps in the formation of an exemplary braided structure.
Figure 5:
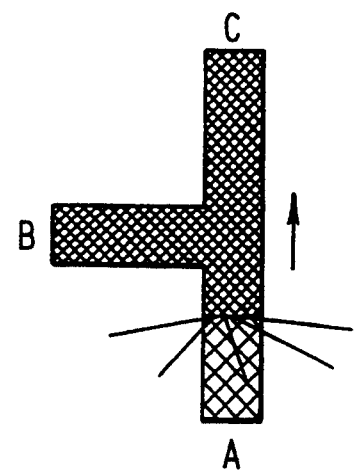
Figure 5:
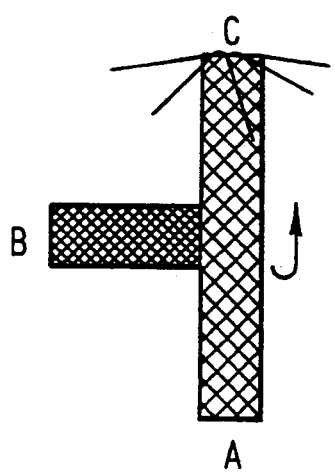
Figure 5:
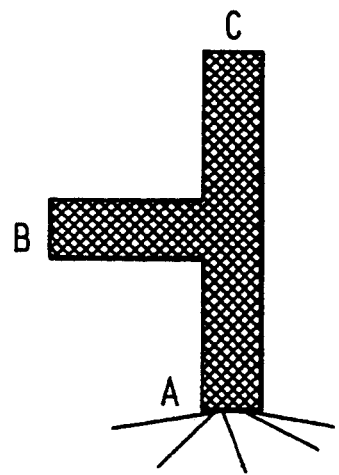

In FIGS. 5(1) to 5(10), which show the steps of a braided structure forming method, the ends of the mandrel 3 are indicated by the letters A, B and C, respectively.

First, the mandrel 3 is held at the end A in the position shown in FIG. 5(1). The braiding direction is perpendicular to the surface of the disk provided with the circular track 1. The braiding starts at the mandrel end A, and the mandrel 3 is moved upward with the progress of the braiding operation. Upon the advancement of the braiding zone to the junction of the tubular members of the mandrel 3, as shown in FIG. 5(2), the mandrel 3 is turned through an angle of approximately 90° in the direction of the arrows shown in FIG. 5(2). Then, the braiding operation is continued as the mandrel 3 is moved upward, as shown in FIG. 5(3), so that the braiding zone advances to the mandrel end B. Upon the advancement of the braiding zone to the mandrel end B, as shown in FIG. 5(4), the mandrel 3 starts moving downward, as indicated by the arrow in FIG. 5(5), to braid the strands F over the braid previously formed on the mandrel 3. In reversing the mandrel 3, it may be preferable to fasten a portion of the braid around the mandrel end B to the mandrel 3 with a tape so that the portion of the braid around the mandrel end B will not become loose. Upon the advancement of the braiding zone to the junction of the tubular members of the mandrel 3, as shown in FIG. 5(6), the mandrel 3 is turned about the junction through an angle of 90° in the direction of the arrows. Then, the braiding zone advances toward the mandrel end C, as shown in FIG. 5(7). Upon the advancement of the braiding zone to the mandrel end C, as shown in FIG. 5(8), the mandrel 3 starts moving upward, as indicated by the arrow in FIG. 5(9), to advance the braiding zone toward the mandrel end A to braid the strands F over the braid previously formed on the mandrel 3 to complete a T-shaped, tubular, braided structure as shown in FIG. 5(10).

FIG. 6 shows the positional relationship between the mandrel 3 and the cylindrical guide 4 in the state shown in FIG. 5(4).

During the braiding operation, the speed at which the mandrel is raised or lowered may be varied during the braiding of the branching portions of the T-shaped, tubular, braided structure corresponding to the portions of the mandrel 3 around the junction, thereby adjusting the density of the strands in the branching portions. If it is desired to enhance the strength of the branching portions of the T-shaped, tubular, braided structure relative to other portions, then the speed at which the mandrel is raised or lowered may be reduced in braiding the branching portions. If it is desired to form the branching portions in the same strand density as that of other portions, then the mandrel raising speed or the mandrel lowering speed may be adjusted accordingly.

The T-shaped, tubular, braided structure formed by the foregoing procedure has a two-layer construction. However, the T-shaped, tubular braided structure need not necessarily be formed entirely in a two-layer construction. For example, the T-shaped, tubular, braided structure may be completed in the state shown in FIG. 5(8). If the T-shaped, tubular, braided structure has the construction shown in FIG. 5(8), only the branch portion of the T-shaped, tubular, braided structure corresponding to the leg of the mandrel 3 has a two-layer construction. Therefore, the moving speed of the mandrel 3 is increased greatly, if possible, to a moving speed twice the moving speed in braiding other portions of the T-shaped, tubular, braided structure so that the strand density is entirely uniform in the T-shaped, tubular, braided structure.

The T-shaped, tubular, braided structure thus formed and covering the mandrel 3 may be impregnated with a molding resin by a conventional method. The mandrel may then be removed, and the inner surface of the T-shaped, tubular, braided structure may be impregnated with the molding resin. If the T-shaped mandrel 3 is rigid, then it may be difficult to remove the T-shaped mandrel 3 from the T-shaped, tubular, braided structure. Therefore, it may be preferable to employ (1) a collapsible composite mandrel, or (2) a mandrel formed of a thermoplastic resin having a softening point lower than that of the molding resin with which the T-shaped, tubular, braided structure is to be impregnated, and to remove the mandrel by heating and softening the same after impregnating the T-shaped, tubular, braided structure with the molding resin, or (3) a mandrel formed of water-soluble resin, and to remove the mandrel by dissolving the same in water.

The speed of pulling up the braided structure may be varied with time during the braiding operation in braiding the braided structure by a conventional flat braiding or a cord braiding machine to braid a flat braid or a cord having a thickness varying with length.

The following is an explanation of FIGS. 7–12, which illustrate an example of a robot hand that may be used for supporting and driving a mandrel, such as a T-shaped mandrel.

Figure 7:
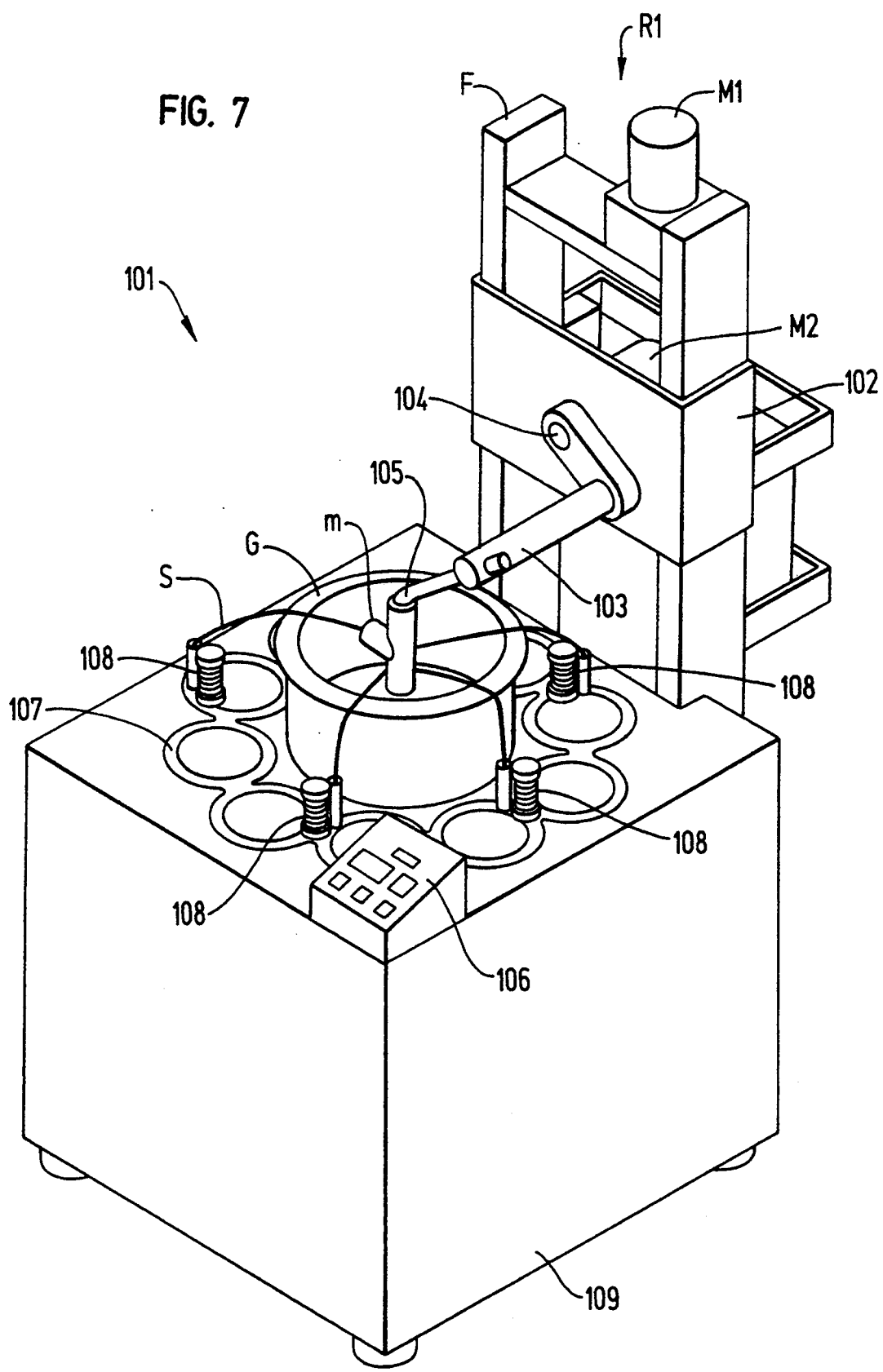
FIG. 7 shows a diagonal view of an example of a braiding apparatus for forming a tubular braid structure in accordance with an embodiment of the present invention.
Figure 8:
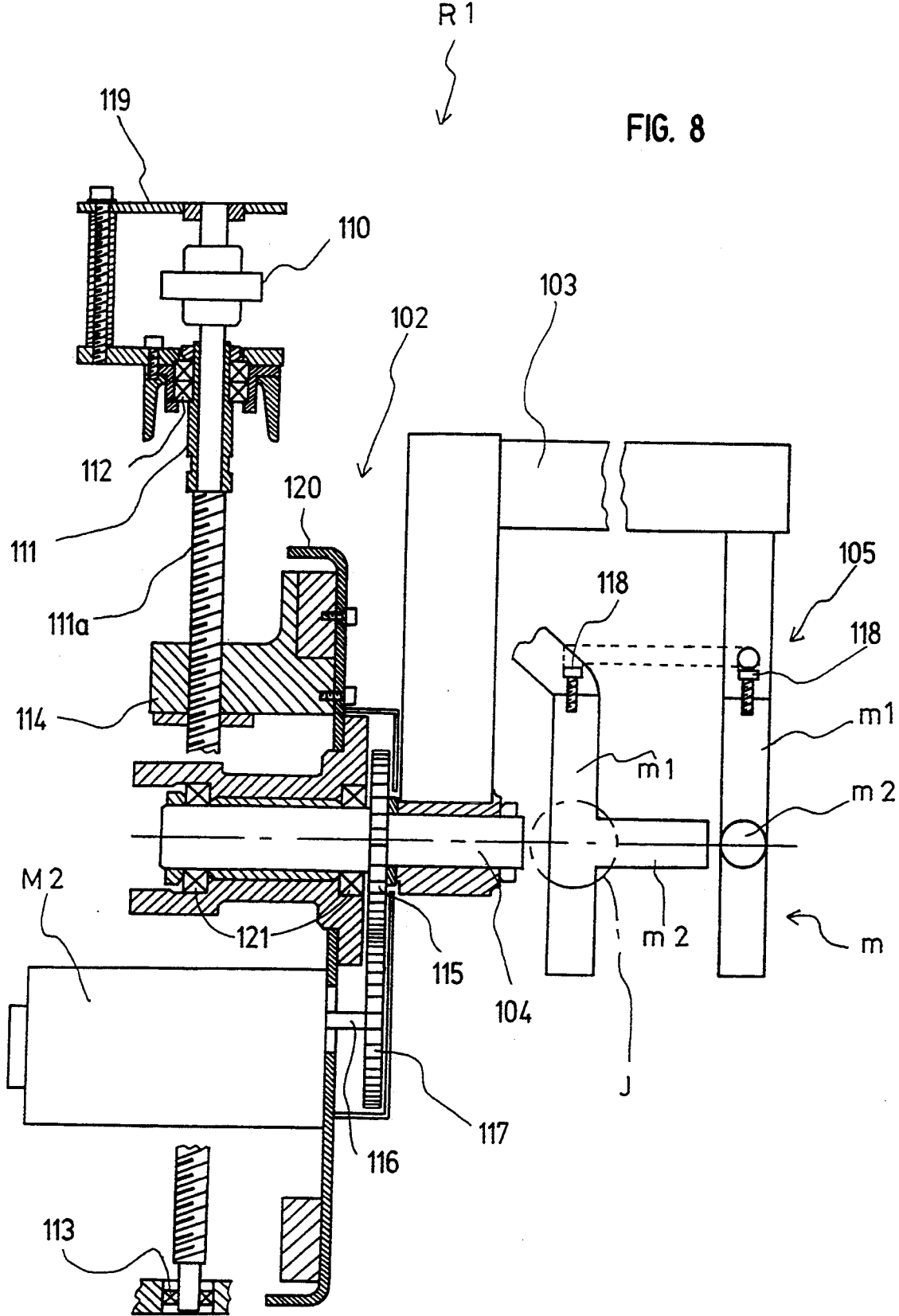
FIG. 8 shows a side view of a main section of the device of FIG. 7.

FIG. 7 shows a diagonal view of an example of a braiding apparatus for forming a tubular braided structure in accordance with an embodiment of the present invention. FIG. 8 shows a side view of a main section of the device of FIG. 7.

Referring to FIG. 7, in the illustrated braiding apparatus 101 for forming a tubular braided structure a plurality of spindles, which load the fiber bundles S, run on a track 107 above a table 109. Braiding is carried out on the surface of the mandrel m from the yarn bundles S which are loaded onto the spindles 108.

Element G illustrates an example of an annular guide, which may be installed concentrically with the track 107. The fiber bundles S are supplied by the guide G to the braiding position at an almost horizontal orientation. Vibration of the guide G may enable an easy interchange between the fiber bundles S.

An example of a robot hand is illustrated as element R1. In the illustrated embodiment of the robot hand R1, a mandrel support section 105 is fixed and supported by a bolt 118 (FIG. 8) and is driven by a motor M1. An elevating block 102 travels up and down a guide frame F. A rotating arm 103 is installed on the elevating block 102. The elevating block 102 and the rotating arm 103 enable the mandrel m to rotate vertically within a vertical plane. Further, the axis about which the rotating arm 103 rotates corresponds to that of the mandrel joint J of the T-shaped mandrel (see FIG. 8).

An example of an operating board is illustrated as element 106. The operating board 106 may be used to control the operation of the braiding apparatus 101 and the robot arm R1.

As shown in FIG. 8, in the illustrated embodiment the elevating block 102 includes a front plate 120 and a power transmission section 114. The rotating arm drive motor M2 is fixed on the elevating block 102. The rotating arm 103 is fixed on the shaft 104, which is supported by the bearing 121.

Element 110 is a pulley that is belt driven by the motor M1 shown in FIG. 7. The pulley 110 is in contact with the shaft 111, which is supported by the bearings 112 and 113. The pulley bracket 119 is fixed above the guide frame F of the elevating block 102 shown in FIG. 7. The main section 111a of the shaft 111 and the power transmission section of the elevating block 102 form a ball screw. The elevating block 102 may travel up and down the guide frame F due to the rotation of the pulley 110 and the shaft 111, and the elevating block 102 may be driven by the motor M1 in either direction. The speed at which the elevating block 102 is driven can be changed by changing the speed of the motor Mi. The rotation of the motor M2, which is loaded on the elevating block 102, drives the shaft 104 via the shaft 116, the gear 117 and the gear 115. The rotating arm 103 may rotate in a clockwise direction or in a counterclockwise direction, depending upon the operating direction of the motor M2. The end of the mandrel m is fixed and supported by the bolt 118 at the support section 105. The center of the mandrel joint J of the mandrel m corresponds substantially to the axis about which the rotating arm 103 revolves. Further, because the illustrated robot hand R1 may be controlled according to a learning function, once the drive of the mandrel m is operated manually by the operation board 106, a control program may be stored in the memory and the mandrel drive may occur automatically according to the program.

Figure 9:
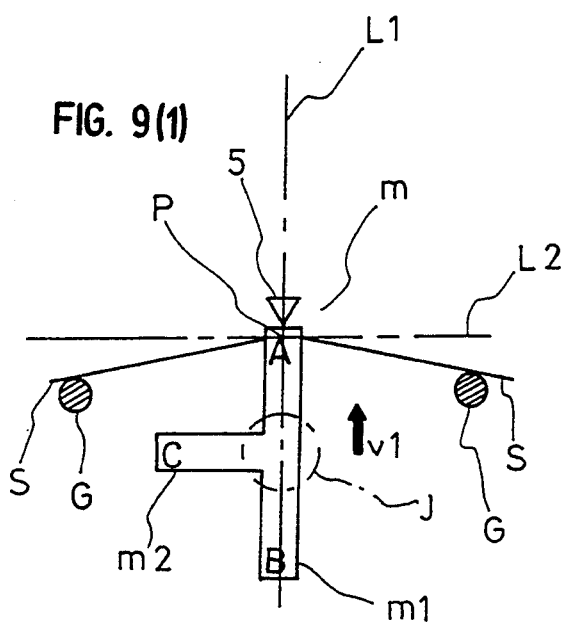
FIGS. 9(1) to 9(21) show views that are of assistance in explaining an example of a braiding process carried out by an embodiment of a braiding apparatus in accordance with the present invention.
Figure 9:
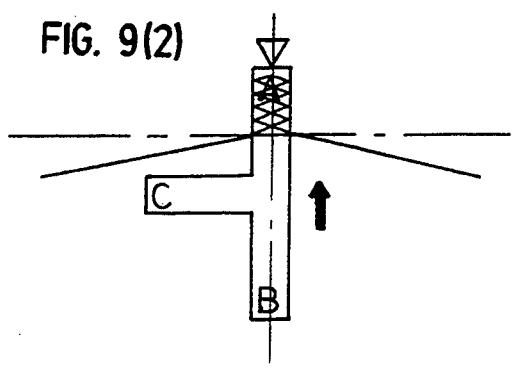
Figure 9:
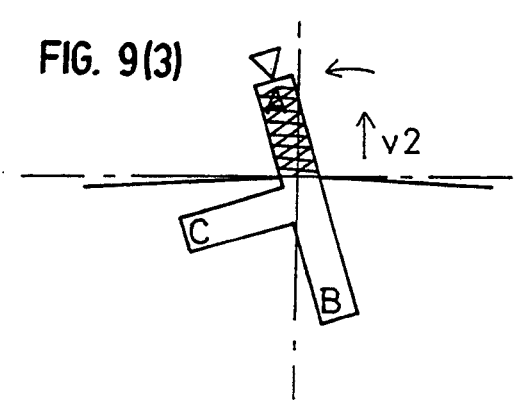
Figure 9:
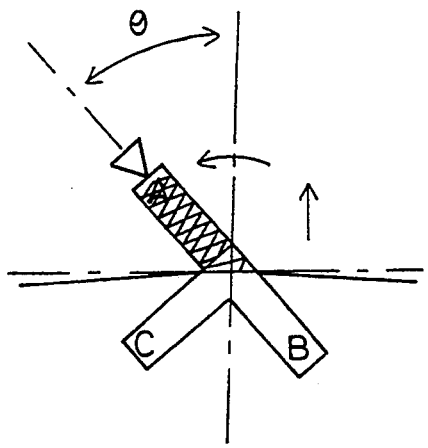
Figure 9:
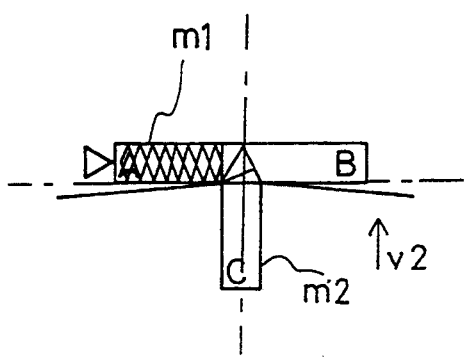
Figure 9:
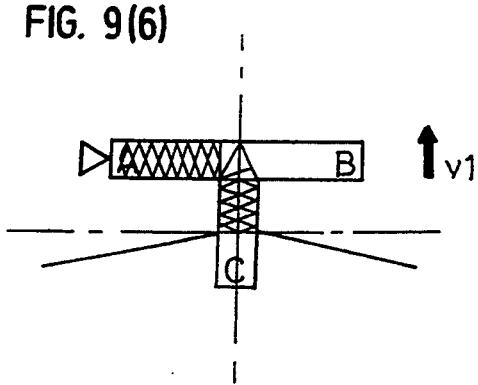
Figure 9:
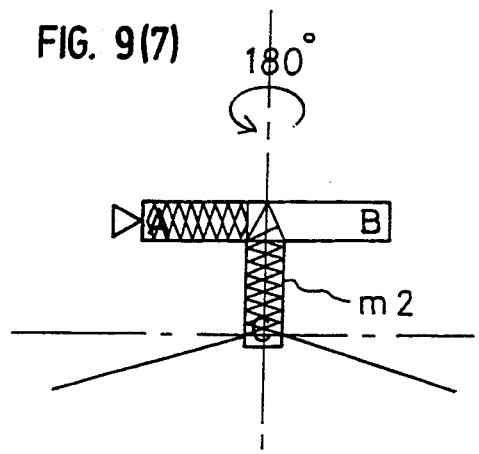
Figure 9:
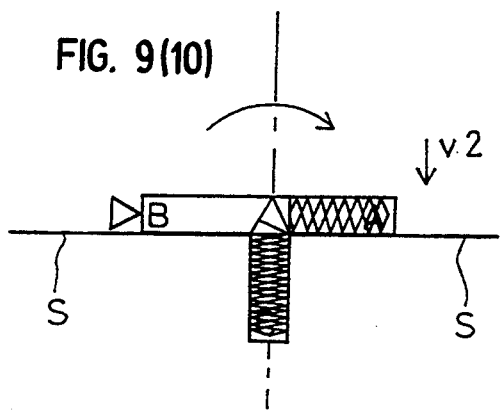
Figure 9:
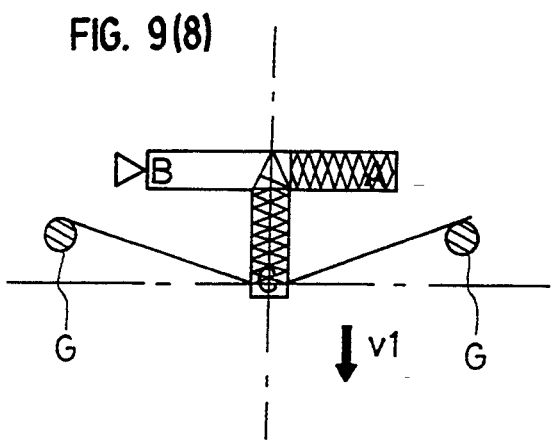
Figure 9:
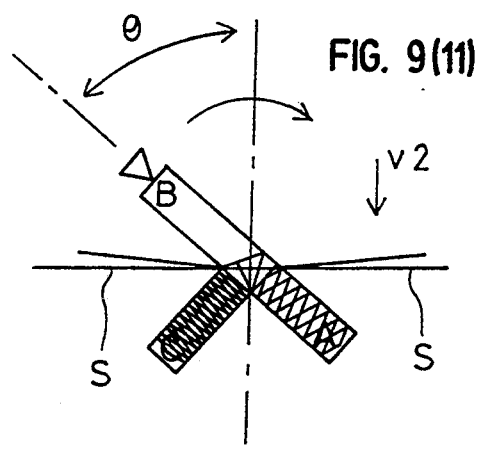
Figure 9:
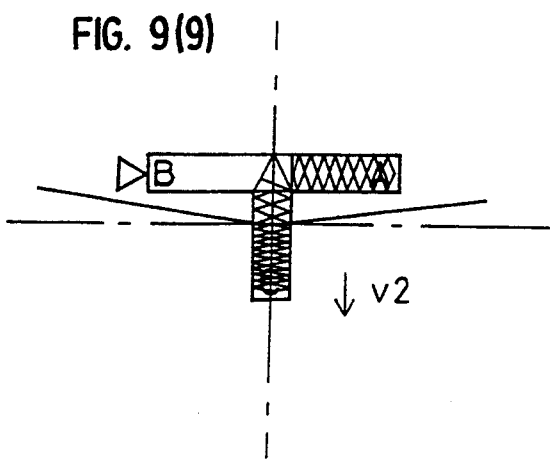
Figure 9:
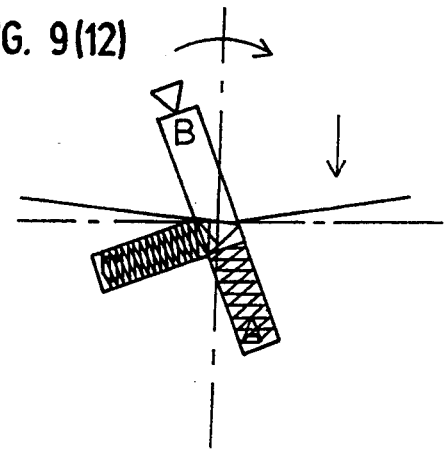
Figure 9:
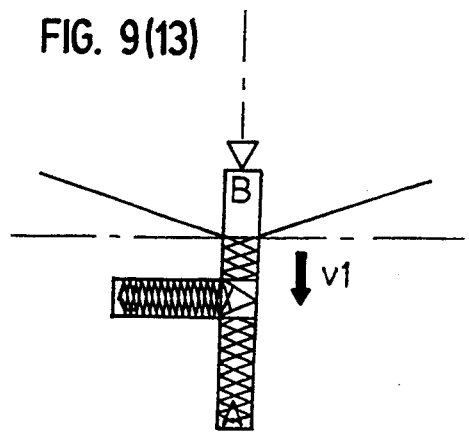
Figure 9:
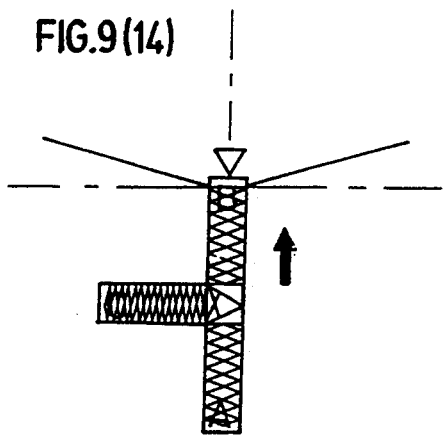
Figure 9:
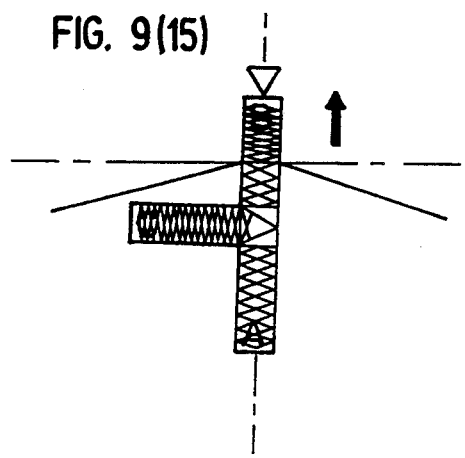
Figure 9:
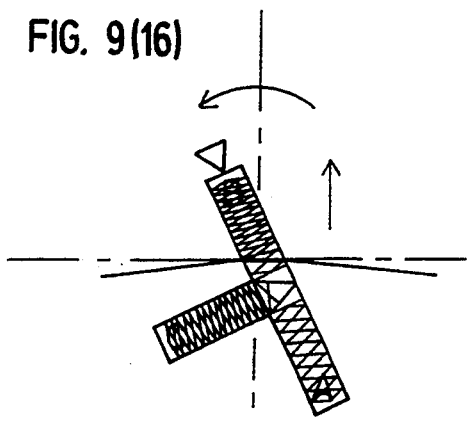
Figure 9:
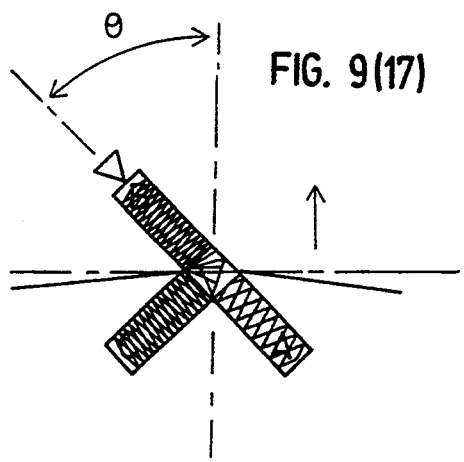
Figure 9:
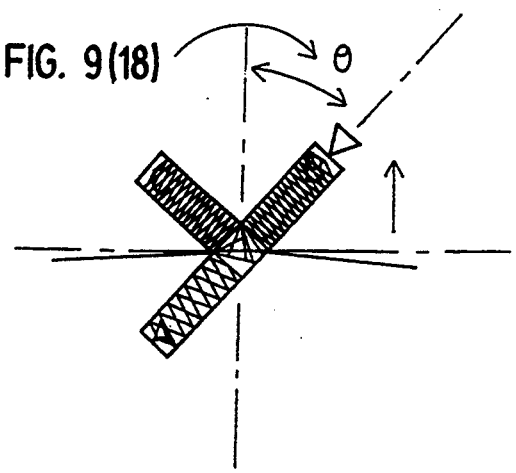
Figure 9:
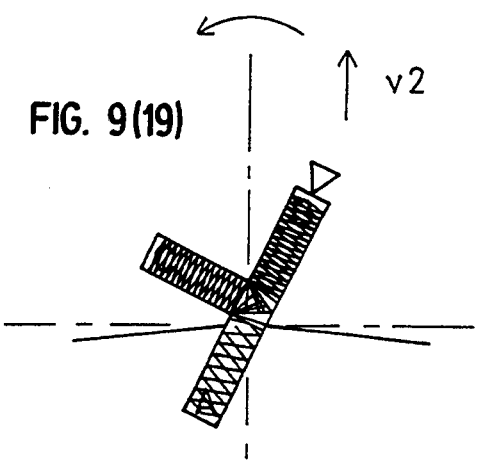
Figure 10:
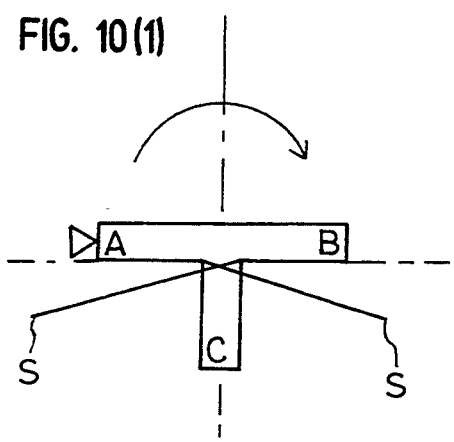
FIGS. 10(1) and 10(2) show an example of the position of a mandrel if the mandrel is not rotated by 180° about the axis of the mandrel branch after the braiding zone reaches the end of the mandrel branch.
Figure 9:
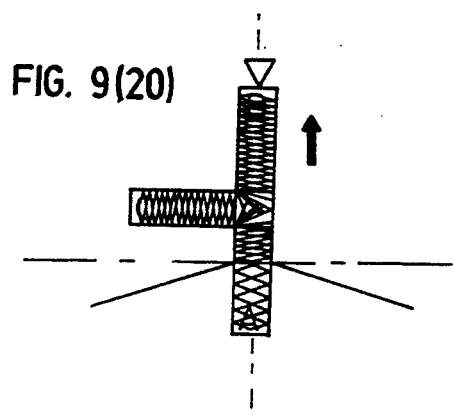
Figure 10:
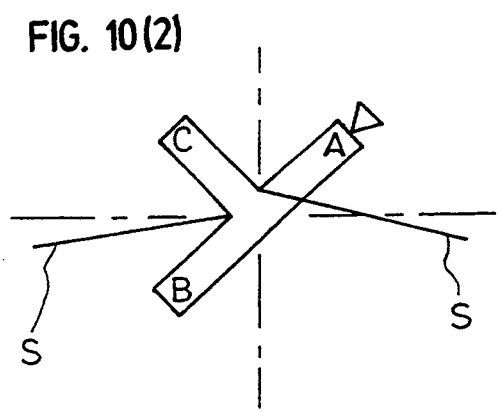
Figure 9:
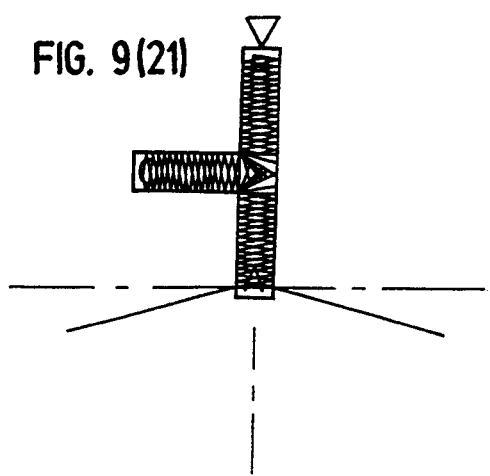

With reference to FIGS. 9(1) to 9(21), the following is an explanation of an example of a braiding process carried out by an embodiment of a braiding apparatus in accordance with the present invention.

First, as shown in FIGS. 9(1) and 9(2), the end A of the main section m1 of the mandrel m is fixed to the mandrel support section 105 of the robot hand R1. The elevating block 102 and the rotating arm 103 are driven by the motor M1 and the motor M2 of the robot hand R1. The mandrel m is supported as shown in FIG. 9(1) and is set in a position wherein the braiding zone P is located substantially at the intersection of the two dotted lines L1 and L2. The line L1 represents a vertical line extending upward from the center point of the track 107 and the annular guide G. The line L2 represents a horizontal line showing the position at which the fiber bundles S are supplied at the surface of the mandrel m. When the mandrel m is pulled upward by the elevating block 102, the braiding zone P is positioned a little higher than the annular guide G. When the mandrel m is pulled downward, the braiding zone P is positioned a little lower than the annular guide G. The spindles 108 running on the track 107 are driven at the same time as the mandrel m is driven vertically upward to start the braiding at a speed substantially equal to the speed of the elevating block, i.e. at a first speed V1. Further, at this time the axis of the main section of the mandrel m is substantially vertical (see steps 1 and 2 in FIG. 12). In other words, the orientation of the axis of the main section of the mandrel corresponds substantially to the dotted line L1. In FIG. 9(1) the element m2 illustrates a mandrel branch, the element J illustrates the mandrel joint and the elements S illustrate the fiber bundles.

As shown in FIGS. 9(2)-9(4), when the braiding zone nears the mandrel joint J, the rotation speed of the motor M1 and the speed at which the elevating block 102 is raised upward are decreased. In other words, when the braiding zone nears the mandrel joint J, the speed of the mandrel m is reduced from the first speed V1 to a second, slower speed V2. Substantially simultaneously with this speed reduction, the rotating arm 103 is driven by the motor M2 to rotate the mandrel m in a counterclockwise direction about the mandrel joint J (see step 3 in FIG. 12). The rotation of the mandrel m by the rotating arm 103 is momentarily stopped when the axis of the main section m1 of the mandrel is at an angle $\theta$ with respect to the vertical axis L1. In the embodiment illustrated in FIG. 9(4), the angle $\theta$ is equal to 45°.

Figure 12:
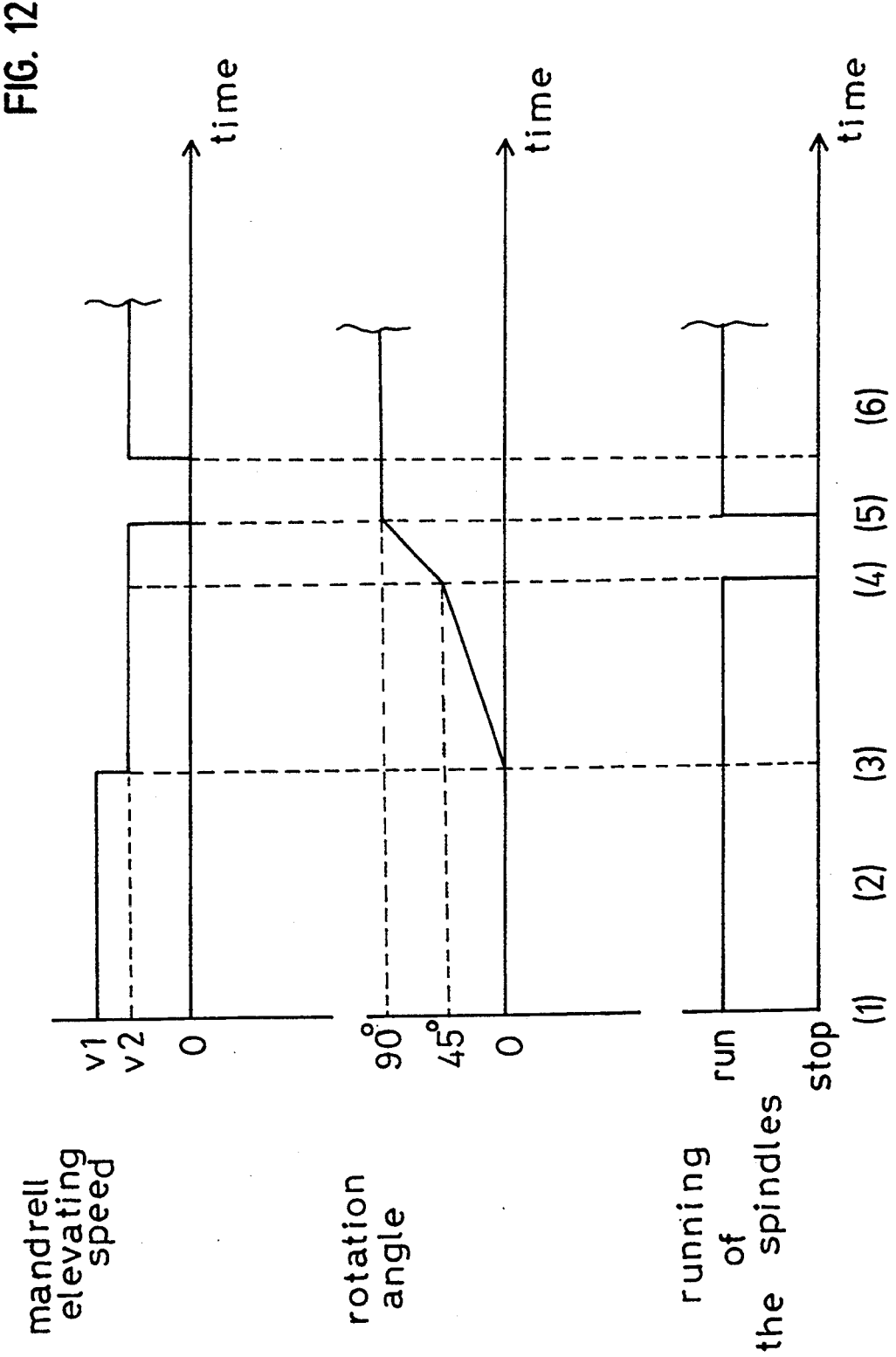
FIG. 12 shows a time chart of the mandrel elevating speed, the rotation angle and the running operation of the spindles of the braiding apparatus shown in FIGS. 9(1) to 9(6).
Figure 13:
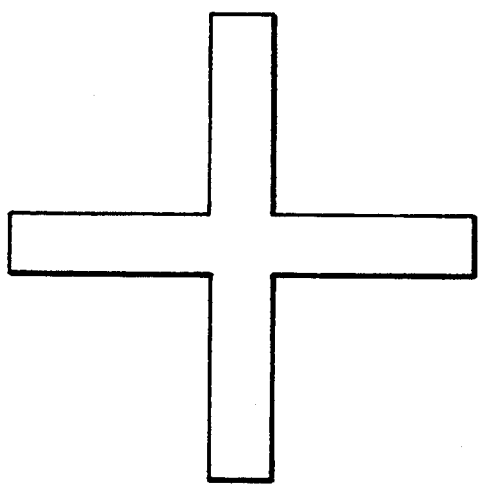
FIG. 13 shows an example of a +-shaped mandrel.

Further, when the braiding zone is substantially adjacent the mandrel joint J, the running of the spindles 108 is momentarily stopped and the braiding is momentarily terminated (see step 4 of FIG. 12). The reduction in braiding speed to the second speed V2 has the effect of increasing the braiding density near the mandrel joint J and thereby increasing the strength of the mandrel joint J.

Next, as shown in FIGS. 9(5) and 9(6), while the operation of the spindles 108 remains momentarily stopped, the rotating arm 103 rotates the mandrel m in a counterclockwise direction, until the axis of the main section of the mandrel is substantially horizontal. While the mandrel m is being rotated, the elevating block 102 continues to rise at the second speed V2 (see steps 4 and 5 of FIG. 12). When the mandrel m has completed its rotation, the running of the spindles 108 is again commenced and the elevating block is stopped (see step 5 in FIG. 12). After the elevating block 102 has been stopped for a short period of time, the elevating block 102 is again raised at the second speed V2 and the braiding of the mandrel branch m2 is commenced (see step 6 in FIG. 12). After a certain amount of braiding has occurred, the braiding speed is increased from the second speed V2 to the first speed V1.

As shown in FIG. 9(7), when the braiding zone on the mandrel branch m2 is substantially adjacent the end C of the mandrel branch m2, the mandrel m is turned about the axis of the mandrel branch m2 by 180°, and the end B of the main section m1 of the mandrel m is fixed at the mandrel support section 105 of the robot hand R1. In order for this turn of the mandrel m to take place so as to achieve an even braiding density at the mandrel joint J (see below), in the present embodiment, the braiding apparatus 101 may be operated manually by an operator. However, it is also possible to operate the apparatus by incorporating a separate robot hand R2, which after the end B of the mandrel is fixed to the support section of the robot hand R2, the mandrel m is released from the support section of the first robot hand R1 and transferred to the second robot hand R2 which drives the mandrel m with the same effectiveness as when the mandrel is turned by 180°.

As shown in FIG. 9(8), after the mandrel m has been turned by 180°, the mandrel m is pulled vertically downward at the speed V1 and braiding of the mandrel branch m2 is resumed.

As shown in FIGS. 9(9) and 9(10), when the braiding zone on the mandrel branch m2 is substantially adjacent the mandrel joint J, the speed of the elevating block 102 is decreased to the second speed V2. After braiding has taken place substantially up to the mandrel joint J at the second speed V2, the running of the spindles S is stopped and the braiding is terminated.

Next, as shown in FIGS. 9(11) and 9(12), while the spindles 108 are stopped, the rotating arm 103 is driven and the mandrel m is thereby rotated clockwise until the mandrel main section m1 is at an angle 8 relative to the vertical axis L1. The mandrel is then lowered at the second speed V2, after which the running of the spindles 108 and the driving of the rotating arm 103 is commenced. In this way the braiding in the main section m1 of the mandrel m is recommenced.

Next, as shown in FIG. 9(13), the rotation of the rotating arm continues until the axis of the mandrel main section m1 is substantially vertical, at which point the rotation of the rotating arm 103 is stopped. Substantially simultaneously the speed of the elevating block 102 is increased to the first speed V1, and braiding up to the end B of the main section m1 of the mandrel m is carried out at the first speed V1.

As shown in FIGS. 9(14) and 9(15), when the braiding zone is substantially adjacent the mandrel end B, the elevating block 102 is elevated, the mandrel m is thereby raised and the braiding along the main section m1 of the mandrel m is thereby continued.

As shown in FIG. 9(16), when the braiding zone nears the mandrel joint J, the speed of the elevating block 102 is decreased to the second speed V2, the rotating arm 103 is driven, and the mandrel m is rotated about the mandrel joint in a counterclockwise direction.

Next, as shown in FIG. 9(17), when the main section m1 of the mandrel m is at an angle θ with respect to the vertical axis L1, the rotation of the rotating arm 103 and running of the spindles 108 are stopped.

As shown in FIGS. 9(18) and 9(19), while the spindles 108 remain stopped, the rotating arm 103 is driven and the mandrel m is rotated about the mandrel joint by approximately 90° in a clockwise direction until the mandrel main section m1 is at an approximately 45° angle with respect to the vertical axis. The mandrel m is then rotated in the opposite direction, at which time the mandrel m is raised at the second speed V2 and the running of the spindles 108 is recommenced.

As shown in FIGS. 9(20) and 9(21), when the axis of the main section m1 of the mandrel m is substantially vertical, the rotating arm 103 is stopped and the rotation of the mandrel m also stops. The speed of the elevating block is increased to the first speed V1. When the braiding zone is substantially adjacent the end A, the braiding process is complete.

Figure 11:
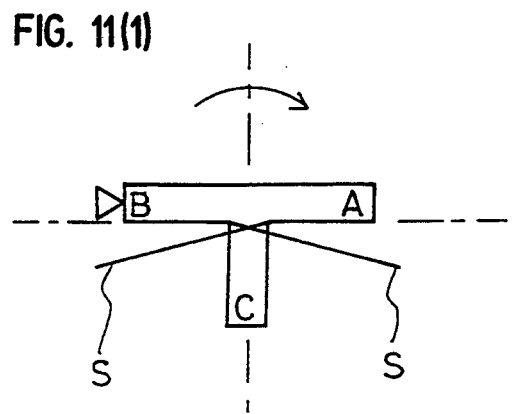
FIGS. 11(1) and 11(2) show an example of a mandrel rotated clockwise through 45° when the mandrel is rotated by 180° about the axis of the mandrel branch.
Figure 11:
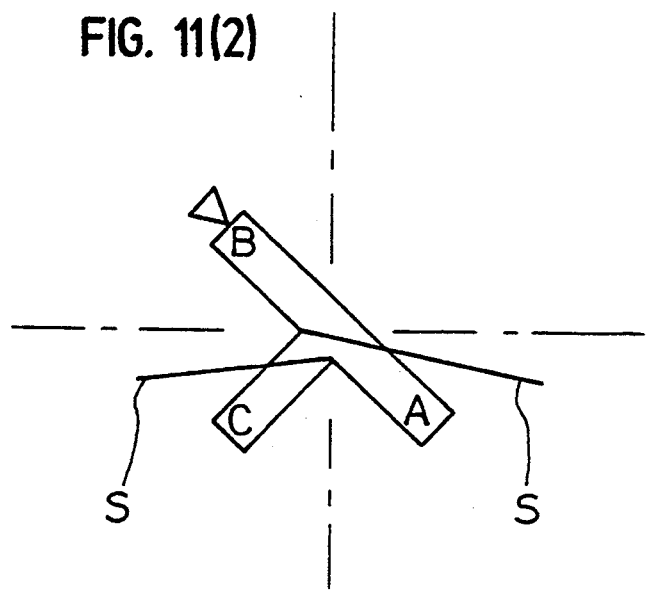

As explained with respect to FIG. 9(7) above, after the braiding zone reaches the end C of the mandrel branch m2, the mandrel is rotated by 180° about the axis of the mandrel branch m2. However, if this rotation does not take place, then the mandrel will be in the position shown in FIG. 10(1) when braiding takes place in the mandrel joint J. In other words, because the strength of the mandrel joint J is increased, the braids on the B side of the mandrel main section m1 are braided so that they overlap as much as possible with the braids at the A side. However, in this case, from the state shown in FIG. 10(1), the mandrel m may be rotated clockwise by about 135° to the state shown in FIG. 10(2), so that the tension, which tends to unbraid the fiber bundles S, acts on the fiber bundles S and interferes with the uniformity of the density of the braiding. In order to overcome this, when the mandrel is rotated by 180° about the axis of the mandrel branch m2 (as shown in FIG. 11(1)), because the mandrel is rotated clockwise through only 45°, it is in the state shown in FIG. 11(2) and so there is no interference to the uniformity of density of the braiding from the tension on the fiber bundles S.

Further, in the above-described process, the braiding at the mandrel main section m1 is a double braiding, but if the process shown in FIGS. 9(15) to 9(21) is short cut, then single braiding can also be carried out.

FIG. 12 is time chart illustrating an example of the mandrel elevating speed, the rotation angle and the running of the spindles 108 of the braiding steps of the braiding apparatus shown in FIG. 9(1) to FIG. 9(6) of the present embodiment.

In the present embodiment, there are two motors which rotate the mandrel and drive it vertically up and down and across the horizontal plane. Furthermore, if another motor is incorporated, more complicated operations can be carried out and a more complicated shape of mandrel can be braided.

As is apparent from the foregoing description, the present invention provides a number of advantages. Some of those advantages include the following: The density of the component strands can be varied at discretion by varying the speed at which the braided structure is raised or lowered over time during the braiding operation, so that varied braided structures can be formed. In forming a braided structure of a composite construction consisting of component portions of different shapes, the junction of the component portions can be formed with the same strand density as that in the component portions or with a strength higher than that of the component portions, so that a braided structure satisfactorily applicable to FRP and FRTP as a core can readily be formed.

What is claimed is:

1. A device for forming a structure of braided material, comprising:

a mandrel having an axis and a first, second and third section and defining a mandrel joint, means for positioning the mandrel so that the mandrel axis is substantially aligned with a first axis, means for moving the mandrel along the first axis in a first direction at a first speed, means for braiding at least a portion of the first section of the mandrel at a braiding zone, means for changing the speed at which the mandrel moves in the first direction to a second speed as the braiding zone approaches the mandrel joint, means for rotating the mandrel about the mandrel joint until the mandrel axis and the first axis form a first angle, means for stopping braiding of the first section when the mandrel axis and the first axis form the first angle, means for rotating the mandrel about the mandrel joint until the mandrel axis and the first axis are substantially perpendicular, means for stopping movement of the mandrel in the first direction when the mandrel axis and the first axis are substantially perpendicular, means for braiding at least a portion of the third section of the mandrel, means for moving the mandrel in the first direction at the second speed, and means for changing the speed at which the mandrel moves in the first direction to the first speed.

2. The device of claim 1 wherein the first angle is substantially equal to 45°.

3. The device of claim 1 wherein the third section of the mandrel defines an end and comprising:

means for rotating the mandrel about a second axis by a second angle when the braiding zone is substantially adjacent the end of the third section, the first and second axes being substantially mutually perpendicular.

4. The device of claim 3 wherein the second angle is substantially equal to 180°.

5. The device of claim 3 comprising:

means for moving the mandrel in a second direction along the first axis at the first speed, the first direction and the second direction being substantially opposite, and means for braiding at least a portion of the third section of the mandrel.

6. The device of claim 5 comprising:

means for changing the speed at which the mandrel moves in the second direction to the second speed as the braiding zone approaches the mandrel joint, means for stopping braiding of the third section when the braiding zone is substantially adjacent the mandrel joint.

7. The device of claim 6 comprising:

means for rotating the mandrel about the mandrel joint until the mandrel axis and the first axis form a third angle, means for braiding at least a portion of the second section of the mandrel.

8. The device of claim 7 comprising:

means for rotating the mandrel about the mandrel joint until the mandrel axis is substantially aligned with the first axis, means for changing the speed at which the mandrel moves in the second direction to the first speed, and means for braiding at least a portion of the second section of the mandrel.

9. The device of claim 8 wherein the second section of the mandrel defines an end and comprising:

means for braiding the second section of the mandrel until the braiding zone is substantially adjacent the end of the second section, means for moving the mandrel in the first direction at the first speed, means for braiding at least a portion of the second section of the mandrel as the mandrel moves in the first direction at the first speed.

10. The device of claim 9 comprising:

means for changing the speed at which the mandrel moves in the first direction to the second speed as the braiding zone approaches the mandrel joint, and means for rotating the mandrel about the mandrel joint in a first direction of rotation until the mandrel axis and the first axis form a fourth angle.

11. The device as in claim 10 comprising:

means for stopping braiding the second section when the mandrel axis and the first axis form the fourth angle, means for rotating the mandrel about the mandrel joint in a second direction of rotation until the mandrel axis and the first axis form a fifth angle, the second direction of rotation being substantially opposite to the first direction of rotation, means for moving the mandrel along the first axis in the first direction at the second speed, and means for braiding at least a portion of the first section of the mandrel.

12. The device as in claim 11 comprising:

means for rotating the mandrel about the mandrel joint until the mandrel axis and the first axis are substantially aligned, means for changing the speed at which the mandrel moves in the first direction to the first speed.

* * * * *